United States Patent [19]
Kurachi et al.

[11] Patent Number: 5,402,715
[45] Date of Patent: Apr. 4, 1995

[54] ROLLING MILL FOR NOODLE MAKING

[76] Inventors: Masayasu Kurachi, 19, Oaza Wadakatsusa Aza Nishinoyama, Konan-shi, Aichi-ken; Seiichi Kondo, 78, Izumi, Kutsukake-cho, Toyoake-shi, Aichi-ken, both of Japan

[21] Appl. No.: 277,472

[22] Filed: Jul. 19, 1994

[30] Foreign Application Priority Data

Jul. 26, 1993 [JP] Japan .................. 5-183922

[51] Int. Cl.⁶ .......... A21C 3/10; A21C 11/22; A21C 11/24; A23P 1/00
[52] U.S. Cl. ................ 99/450.2; 99/353; 99/484; 425/194; 425/294; 425/336
[58] Field of Search .................. 99/353–355, 99/450.1, 450.2, 450.7, 484, 494; 425/296, 363, 101, 294, 335–337, 194

[56] References Cited

U.S. PATENT DOCUMENTS

| | | | |
|---|---|---|---|
| 3,744,401 | 7/1973 | Polan | 99/352 |
| 4,072,454 | 2/1978 | Jen-Shuy | 425/294 |
| 4,083,668 | 4/1978 | Bardwick, III et al. | 425/194 |
| 4,089,259 | 5/1978 | Stickle et al. | 99/355 |
| 4,121,301 | 10/1978 | DeFrancisci | 99/353 |
| 4,360,332 | 11/1982 | Cyin | 99/353 |
| 4,674,401 | 6/1987 | Goli | 99/353 |
| 4,777,005 | 10/1988 | Miller | 425/363 |
| 4,925,599 | 5/1990 | Turk et al. | 425/363 |
| 4,955,803 | 9/1990 | Miller et al. | 425/363 |
| 5,102,609 | 4/1992 | Miller et al. | 425/363 |
| 5,165,331 | 11/1992 | Hayashi et al. | 99/450.2 |

*Primary Examiner*—Timothy F. Simone
*Attorney, Agent, or Firm*—Dennison, Meserole, Pollack & Scheiner

[57] ABSTRACT

A rolling mill for use in a noodle making apparatus, of the type adapted for rolling a noodle sheet of a predetermined width, includes a plurality of rolling sections arranged in a set and each having pairs of upper and lower rolls. The set includes a pair of grooved rolls for pressingly forming a plurality of mountain and valley portions on the noodle sheet parallel to the extending longitudinal direction thereof, and at least one pair of gear-type rolls for pressingly forming a plurality of mountain and valley portions on the noodle sheet parallel to the transverse direction thereof.

4 Claims, 6 Drawing Sheets

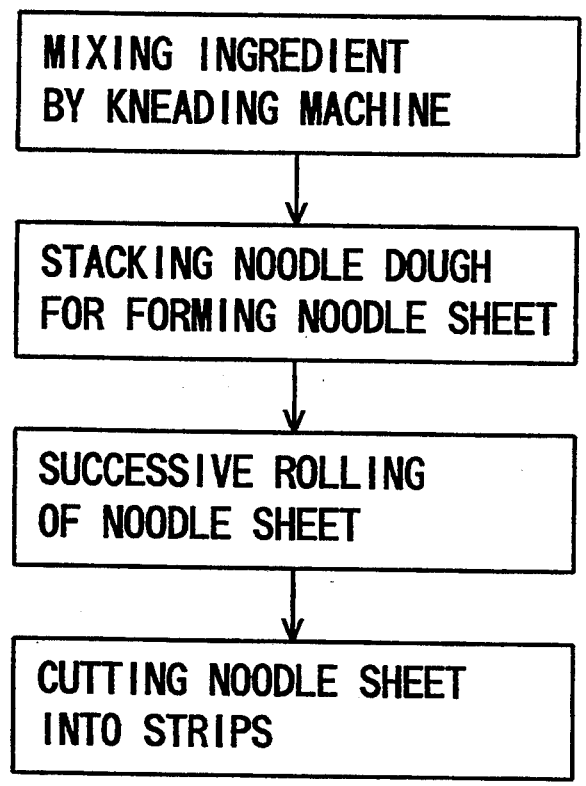
FIG. 7
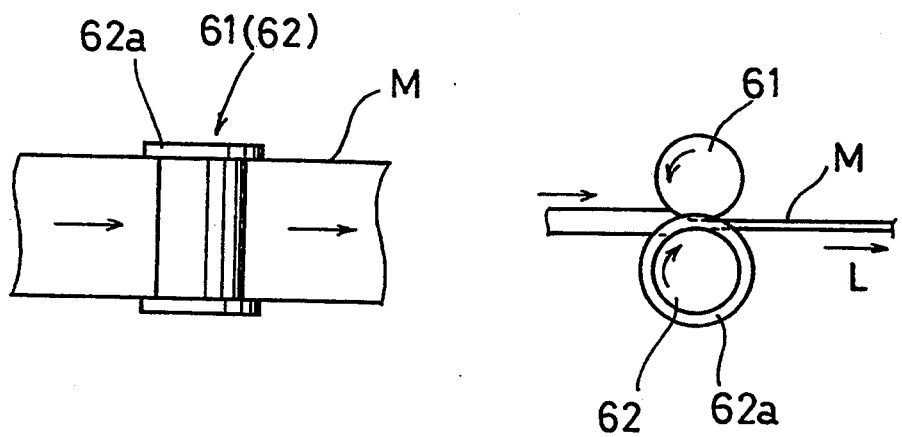
FIG. 8(a)
PRIOR ART
FIG. 8(b)
PRIOR ART

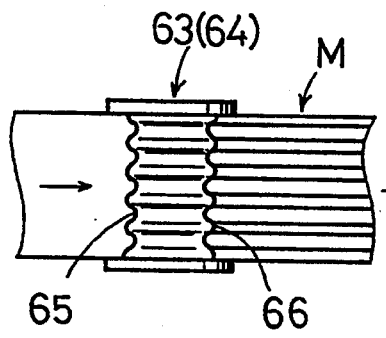
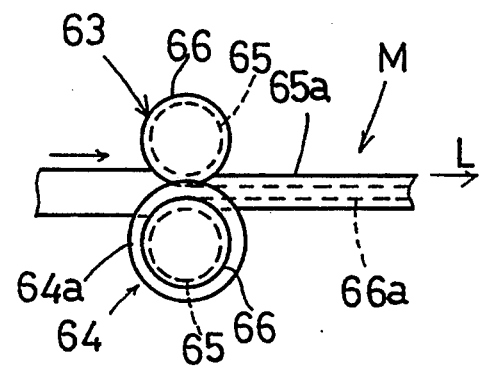
FIG.9(a)
PRIOR ART
FIG.9(b)
PRIOR ART
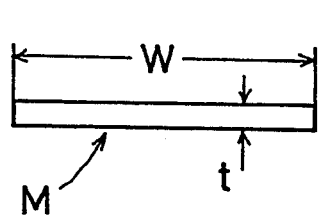
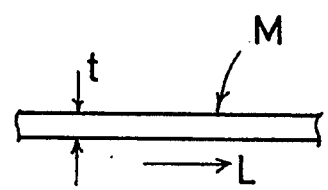
FIG.10(a)
PRIOR ART
FIG.10(b)
PRIOR ART
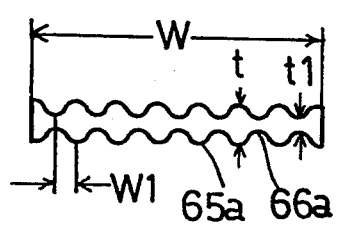
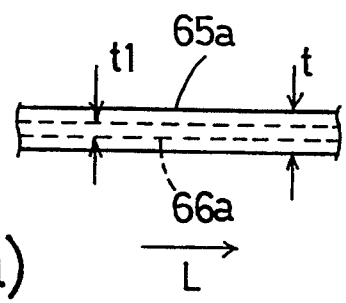
FIG.11(a)
PRIOR ART
FIG.11(b)
PRIOR ART
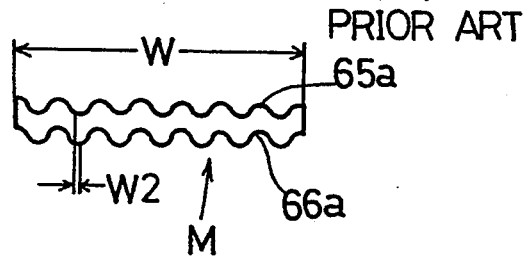
FIG.11(c)
PRIOR ART

ROLLING MILL FOR NOODLE MAKING

BACKGROUND OF THE INVENTION

1. Field of the Invention

The present invention relates to a noodle making apparatus, and more particularly to a rolling mill for rolling a noodle sheet.

2. Description of the Prior Art

Generally as shown in FIG. 7, a noodle making comprises the steps of mixing ingredients in a kneading machine, stacking noodle dough by a single pair of rolls or a series of pairs of rolls so as to form a noodle sheet, rolling the noodle sheet successively to finally obtain a desired thickness, and cutting the rolled noodle sheet into strips. Of all the steps, the rolling step is the most important, wherein dough is degassed and regulated in density, and gluten therein is refined. In this step, extending rolls are arranged vertically in pair. As shown in FIGS. 8(a) and 8(b), a lower smooth columnar roll 62 is formed with flanges 62a on both sides thereof, and an upper smooth roll 61 is formed into such a length as to be fitted between the flanges 62a. The upper roll I is moved up and down by an adjusting screw and is adjusted within the height of the flanges 62a so that a noodle sheet M may be finally reduced to a desired thickness by rolling. FIGS. 9(a) and 9(b) show another construction of the smooth rolls. As shown therein, a pair of upper and lower grooved rolls 63 and 64 includes concavities 65 and convexities 66 of a constant radius formed at regular intervals on the peripheries of the grooved rolls 63 and 64 in the longitudinal direction thereof. The lower grooved roll 64 is formed with flanges 64a on both sides thereof, so that the upper grooved roll 63 may be fitted between the flanges 64a. The gap between rolls 63 and 64 is adjustable. These smooth rolls 61 and 62, or the grooved rolls 63 and 64 are arranged in plural pairs.

When rolled by the rolls 61 and 62, the noodle sheet M is fed flat in an extending longitudinal direction L thereof, with its width W constant but with its thickness t changed, as shown in FIGS. 10(a) and 10(b). Further, FIGS. 11(a), 11(b), and 11(c) show the shape of the noodle sheet M when rolled by a pair of grooved rolls 63 and 64 with its width W constant. In FIG. 11(a), each concavity 65 or each convexity 66 on the opposite rolls 63 and 64 face each other. Thus, the two opposed concavities 65 form a mountain portion 65a with thickness t, and the two opposed convexities 66 form a valley portion 66a with thickness t1, as shown in FIG. 11(a) and 11(b). Here, the cross section of the mountain portion 65a is formed into a substantially circular shape. Thus, a series of mountain portions 65a and the valley portions 66a are fed in the longitudinal direction L. The phase of the groove differs by width W1 between the upper and lower surfaces of the noodle sheet M, so that the noodle sheet M is formed into a substantially bellow-like cross-sectional shape in the transverse direction thereof. In contrast, in FIG. 11(c), the cross section of the noodle sheet M is formed into a substantially wave-like shape, since the phase of the groove differs by width W2, and is fed in the longitudinal direction L. The noodle sheet M rolled by such a single pair of rolls is stacked double and then rolled. This step is repeated several times. Then, the gap between the upper and lower rolls is reduced step by step to finally form the noodle sheet M into the desired thickness.

When rolling the noodle sheet M by the rolls 61 and 62 or the rolls 63 and 64, degassing, density regulating and gluten refining can be effectively performed in the longitudinal direction L. However, during the process of passing through the gap between the rolls 61 and 62 or the rolls 63 and 64 several times, gluten in the noodle sheet M is gradually aligned in the longitudinal direction L, but is not satisfactorily regulated and refined in the transverse direction of the noodle sheet M, thus making it impossible to obtain such a good texture and taste as hand-rolled fine noodles have. That is the reason why the noodles made by a conventional rolling mill cannot be compared with the noodles made by hand.

To solve the above problem, as shown in FIGS. 12(a) and 12(b), a first conveyer 67 is provided to feed the noodle sheet M rolled by a pair of smooth rolls 61 and 62, for instance, at a predetermined angle $\theta$ into a second conveyer 68 positioned below the end of the first conveyer 67. Two finger bars 69 are disposed between the first and the second conveyers 67 and 68 such that they may swing horizontally at a predetermined angle. When the swinging speed of the finger bars 69 and the feeding speed of the second conveyer 68 are properly regulated, the successively fed noodle sheet M can be folded zigzag to be formed into folded noodle sheet MO with width W'. The folded noodle sheet MO is then rolled so that the difference from hand-rolled noodles is minimized as small as possible. However, the above-mentioned folding operation tends to be cumbersome, thus reducing the efficiency of noodle production.

SUMMARY OF THE INVENTION

Accordingly, an object of the present invention is to provide a rolling mill for noodle making which enables the extension of the noodle sheet not only in its longitudinal direction but also in its transverse direction so that noodles can obtain good texture and taste which hand-rolled fine noodles have. In order to solve the above-mentioned technical problem, there is provided a rolling mill for use in a noodle making apparatus, of the type adapted for rolling a noodle sheet of a predetermined width, which includes a plurality of rolling sections arranged in a set and each having pairs of upper and lower rolls. The set includes a pair of grooved rolls for pressingly forming a plurality of mountain and valley portions on the noodle sheet parallel to the extending longitudinal direction thereof, and at least one pair of gear-type rolls for pressingly forming a plurality of mountain and valley portions on the noodle sheet parallel to the transverse direction thereof.

With this arrangement, kneading and rolling operations upon the noodle sheet can cause gluten to be formed into a network structure substantially uniformly over the entire noodle sheet.

The present invention will be more fully understood from the following detailed description and appended claims when taken with the accompanying drawings.

BRIEF DESCRIPTION OF THE DRAWINGS

FIG. 7 is a schematic diagram showing steps of noodle making;

FIGS. 8(a) and 8(b) are a plan view and a side view, respectively, of a pair of conventional smooth rolls;

FIGS. 9(a) and 9(b) are a plan view and a side view, respectively, of a pair of conventional grooved rolls;

FIGS. 10(a) and 10(b) are explanatory representations of a noodle sheet rolled by the pair of smooth rolls;

FIGS. 11(a), 11(b) and 11(c) are explanatory representations of the noodle sheet rolled by the pair of grooved rolls.

DETAILED DESCRIPTION OF THE PREFERRED EMBODIMENT

Figure 1:
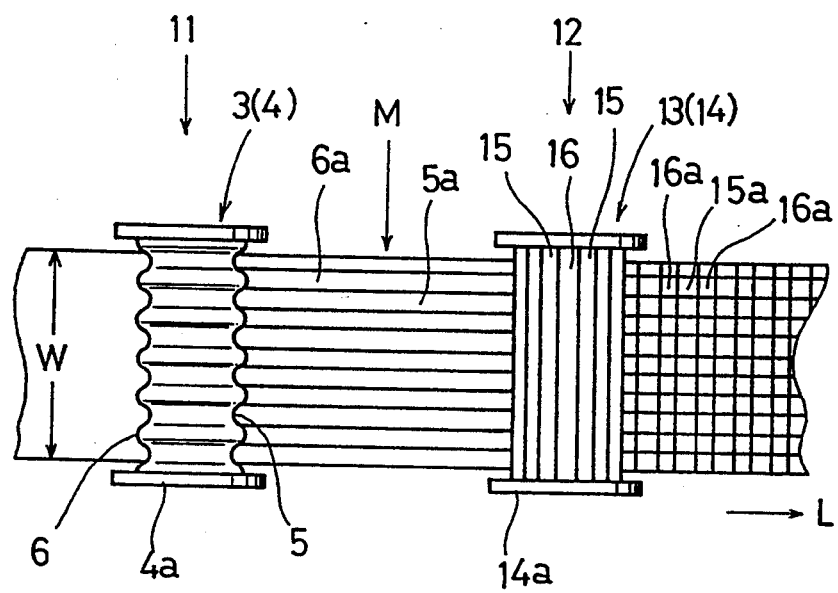
FIG. 1 is a plan view of a first embodiment of the present invention, showing a pair of grooved rolls and a pair of gear-type rolls arranged in a set.

Now, a rolling mill for noodle making according to a first embodiment of the present invention will be described with reference to FIGS. 1 and 2. FIG. 1 shows a first and a second rolling section 11 and 12 of the rolling mill for noodle making. The first and the second rolling sections 11 and 12 are arranged in a set, and a plurality of sets are arranged in the rolling mill.

The first rolling section 11 includes a pair of upper and lower grooved rolls 3 and 4 whose peripheries are formed with concavities 5 and convexities 6 at regular intervals in the longitudinal direction of the rolls. In contrast, the second rolling section 12 includes a pair of upper and lower rolls 13 and 14 whose peripheries are formed with concavities 15 and convexities 16 in such a manner that the rolls 13 and 14 are formed into gear-type rolls of substantially gear-shaped configuration in cross section. The lower roll 14 is formed with flanges 14a on both sides thereof so that the upper roll 13 can be fitted between the flanges 14a. The first and second sections 11 and 12 are arranged at regular intervals, and each gap between each pair of the grooved rolls 3 and 4 or the gear-type rolls 13 and 14, is adjustable by means of adjusting screws.

The rolling mill includes a plurality of the first and second rolling sections 11 and 12 constructed as described above. The gap between the pair of rolls of each rolling section 11 or 12 is arranged to be gradually reduced from the former pairs to the latter pairs, so that a noodle sheet M is finally reduced to a desired thickness after passing through all the rolling sections.

Figure 2A:
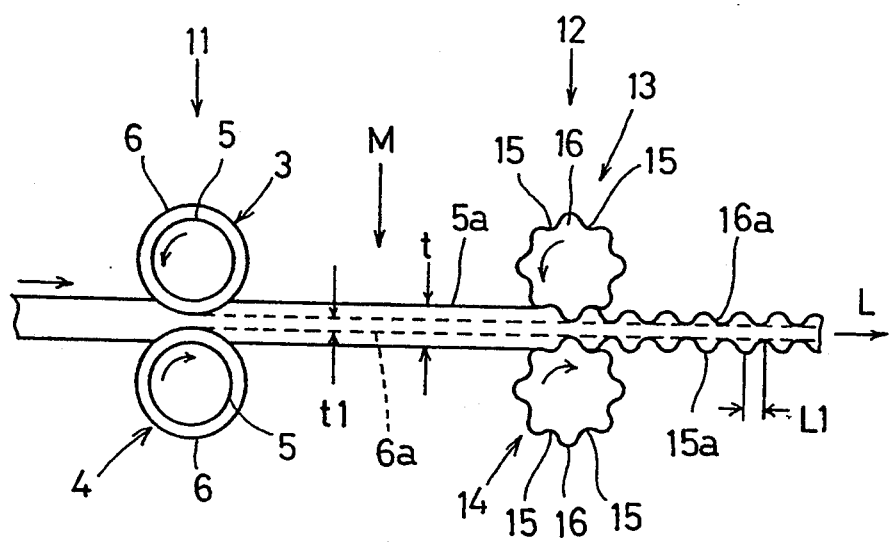
FIG. 2(a) is a side view of the first embodiment of FIG. 1.
Figure 2B:
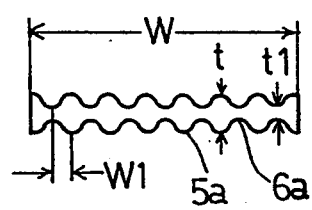
FIG. 2(b) is an explanatory representation of a noodle sheet rolled by the pair of the grooved rolls.

Specifically, as shown in FIGS. 2(a) and 2(b), the noodle sheet M is fed into the pair of grooved rolls 3 and 4 and is pressed by the concavities 5 and convexities 6 of the rolls, so that the noodle sheet M is formed with mountain portions 5a of thickness t and with valley portions 6a of thickness t1 in the same manner as the conventional rolls. As best shown in FIG. 2(b), the cross section of each mountain portion 5a renders substantially a circle. The phase between upper and lower surfaces of the noodle sheet differs W1 in the transverse direction thereof, thus providing the noodle sheet with a substantially bellow-shaped cross section in the same direction. Then, the noodle sheet M is fed in an extending longitudinal direction L.

The noodle sheet M, which has been rolled by the grooved rolls 3 and 4 of the first rolling section 11 to form the bellow-shaped cross section in the transverse direction of the noodle sheet M, is rolled in succession by the gear-type rolls 13 and 14 of the second rolling section 12. As may be seen in FIGS. 1 and 2(a), when rolled by the gear-type rolls 13 and 14, the noodle sheet M is pressed to be formed, in contrast to the rolling by the grooved rolls 3 and 4, i.e. parallel to the transverse direction thereof, with mountain portions 15a and valley portions 16a by the respective concavities 15 and convexities 16. The phase difference L1 is provided between the upper and lower surfaces of the noodle sheet M, so that the noodle sheet M is rolled in the longitudinal direction L with substantially bellow-shaped cross section in the same direction. As a result, a series of mountain portions 5a and 15a and valley portions 6a and 16a form an uneven checker-pattern on both surfaces of the noodle sheet M. The uneven checker-pattern is pressingly formed at random by the subsequent sets of rolling sections. Thus, the noodle sheet M is pressingly formed with the uneven checker-pattern by a plurality of sets of the grooved rolls 3 and 4 and the gear-shaped rolls 13 and 14, and is reduced in the last rolling step to the desired thickness by conventional smooth rolls for instance, and is then fed to a noodle cutting step.

As described above, the combination of the pair of upper and lower grooved rolls 3 and 4 and the gear-shaped rolls 13 and 14 permits the noodle sheet M to be rolled not only in the longitudinal direction L as in the conventional art, but also in the transverse direction. The operation performed by the convexities 6 of the grooved rolls 3 and 4 or by the convexities 16 of the gear-shaped rolls 13 and 14 is equivalent to the kneading operation by hands or heels performed in handmade noodles. Therefore, kneading and compressing operations by the grooved rolls 3 and 4 and the gear-shaped rolls 13 and 14 can cause the gluten produced in the noodle sheet M to be formed into a network structure almost evenly over the entire noodle sheet M. With this bonding structure in the gluten, moisture holding ability thereof is enhanced at the same time, so that the density of the noodle sheet M is properly regulated. Thus, the noodle sheet M can be kneaded as satisfactorily as hand-rolled noodles, and when it is cut into strips, fine noodles can be obtained having the same good texture and taste as the handmade noodles.

In the above embodiment, the concavities face each other on confronting surfaces of the rolls, and the convexities face each other likewise. Instead, the concavities and the convexities may face in a staggered manner.

Figure 3:
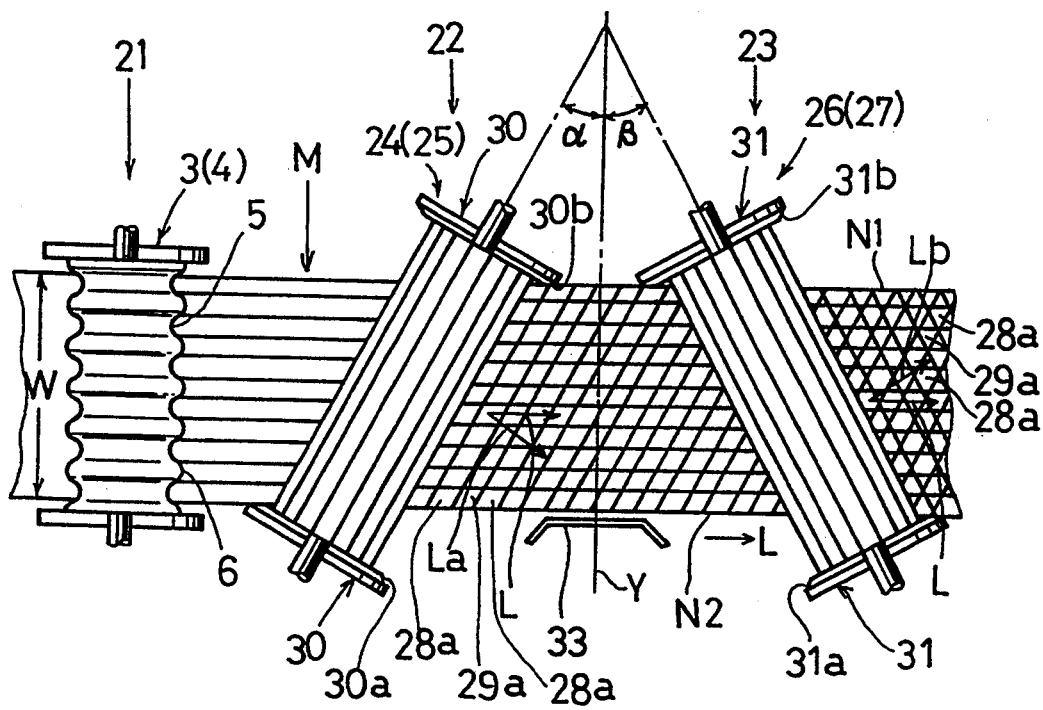
FIG. 3 is a plan view showing an arrangement of a first, a second, and a third rolling sections of a second embodiment of the present invention.
Figure 4:
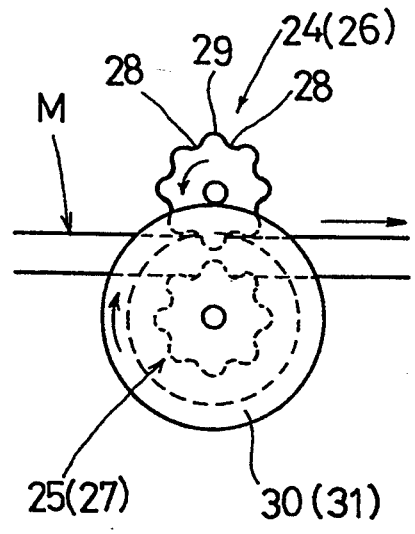
FIG. 4 is a side view of the second and third rolling sections of the second embodiment.

FIGS. 3 and 4 show a second embodiment of the present invention, in which a rolling mill for noodle making is comprised of plural sets each including a first rolling section 21, a second rolling section 22, and a third rolling section 23. The same grooved rolls 3 and 4 as used in the first embodiment are arranged in the first rolling section 21. The second rolling section 22 includes a pair of upper and lower gear-type rolls 24 and 25 obliquely disposed at a predetermined angle $\alpha$ relative to the transverse direction of the noodle sheet M. The third rolling section 23 includes a pair of upper and lower gear-type rolls 26 and 27 obliquely disposed at a predetermined angle $\beta$ relative to the transverse direction of the noodle sheet M. As may be seen in FIG. 3, the first-mentioned rolls 24 and 25 and the second-mentioned rolls 26 and 27 are disposed in such a manner as to be spread apart from each other. The rolls 24 and 25 and the rolls 26 and 27 are formed with concavities 28 and convexities 29 on their peripheries in the same manner as the first embodiment, thus being formed to have gear-shaped cross sections. The rolls 24 and 25 of the second rolling section 22 are obliquely disposed a predetermined distance apart from the first rolling section 21, as shown in FIG. 3. Specifically, the rolls 24 and 25 are arranged to face the first section 21 at the slanting angle $\alpha$ relative to line Y of the transverse direction. The length of the rolls 24 and 25 is determined to be slightly longer than the slanting length of the width W of the noodle sheet M. The lower roll 25 is formed on both sides thereof with flanges 30 of a predetermined thickness. The flanges 30 are used not only to fit the upper roll 24 therebetween but also to restrict the width of the noodle sheet M by tapered receiving sections 30a and 30b which are formed on the inside surfaces of the flanges 30 and which are chamfered at a predetermined angle.

Further, the third rolling section 23 includes a pair of upper and lower gear-type rolls 26 and 27 formed in the same manner as the above mentioned gear-type rolls 24 and 25. They are obliquely disposed toward the longitudinal direction L at a predetermined angle $\beta$ relative to line Y of the transverse direction. As with the above lower roll 24, the lower roll 27 is formed on both sides thereof with flanges 31 which is of a predetermined thickness and which have tapered receiving sections 31a and 31b formed on the inside surfaces thereof. The receiving sections 31a and 31b of the flanges 31 are arranged to touch both edges N1 and N2 of the noodle sheet M. Further, an end face guide plate 33 is arranged at a predetermined position along the edge N2 between the rolls 24 and 25 and the rolls 26 and 27. Plural sets of the first, second, and third rolling sections 21, 22 and 23 are arranged in the rolling mill.

In the second embodiment thus arranged, the gear-type rolls 24 and 25 of the second rolling section 22 and the gear-type rolls 26 and 27 of the third rolling section 23 are disposed at the respective predetermined angles $\alpha$ and $\beta$ to and across line Y parallel to the transverse direction of the noodle sheet M. Accordingly, the noodle sheet M rolled in the rolling section 21 is further rolled by the gear-type rolls 24 and 25 of the second rolling section 22 in two different directions shown by arrows L and La, thus being pressed and formed with mountain portions 28a and the valley portions 29a slanted by angle $\alpha$. Then, the noodle sheet M is rolled by the gear-type rolls 26 and 27 of the third rolling section 23 in two different directions shown by arrows L and Lb, thus being pressed and formed with mountain portions 28a and the valley portions 29a slanted by angle $\beta$. As a result, the same effect as obtained in the first embodiment can be obtained also in the second embodiment, and the extension in the different directions La and Lb produce the same effect as obtained when noodle dough is manually rolled out into a square with a rolling pin. With the above described effect, the network structure of the gluten can be more evenly formed over the entire noodle sheet M, thus making it possible to knead the noodle sheet M as satisfactorily as the manual kneading and to obtain such a fine noodle sheet M as obtained by handmade noodles.

Figure 5:
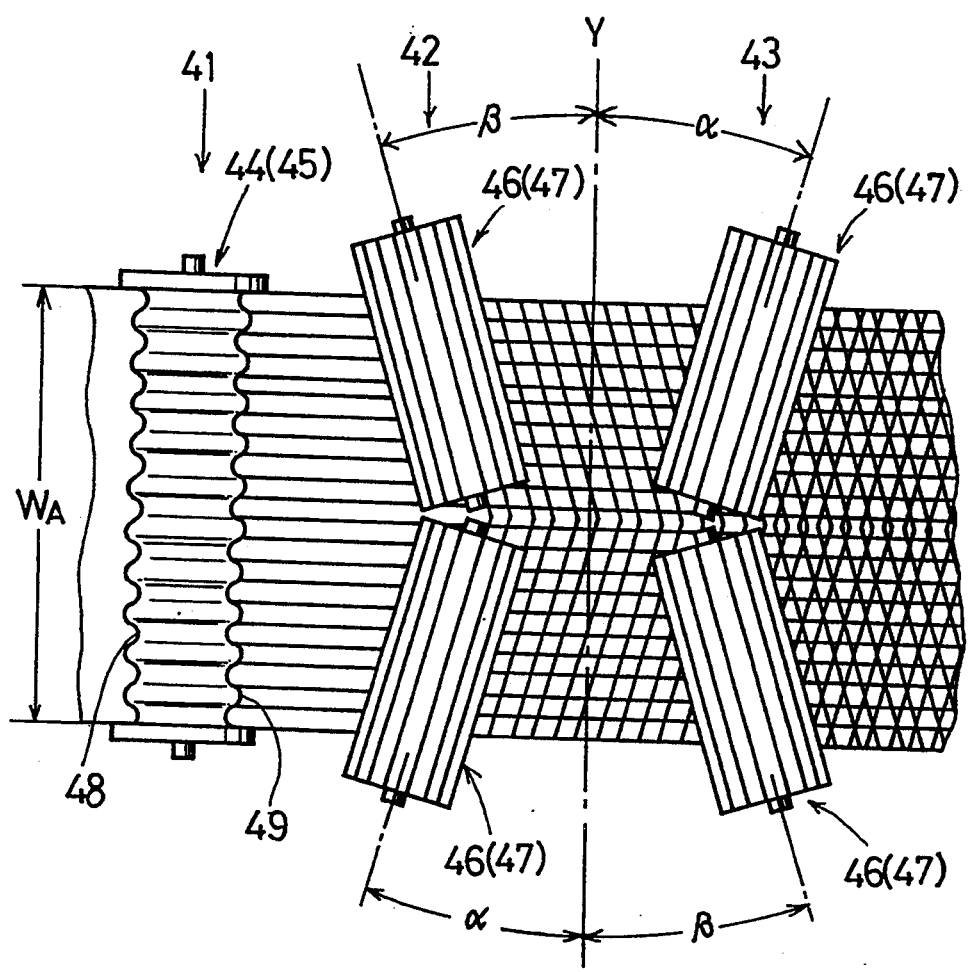
FIG. 5 is a plan view showing an arrangement of a first, a second, and a third rolling sections of a third embodiment of the present invention.

Referring now to FIG. 5, a third embodiment will be described. The concept of this embodiment has been developed from the second embodiment so that the noodle sheet M may be rolled wider with a width of WA. In this embodiment, a first, a second and a third rolling section 41, 42, and 43 are arranged in a set.

The first rolling section 41 includes grooved rolls 44 and 45 formed longer than the grooved rolls 3 and 4 of the first embodiment, in order to comply with the width WA of the noodle sheet M. The grooved rolls 44 and 45 are formed with concavities 48 and convexities 49. As shown in FIG. 5, the second rolling section 42 is arranged such that the second rolling section 22 of the second embodiment is connected to the third rolling section 23 thereof in a rightwardly-slanting manner relative to line Y, and the third rolling section 43 is arranged such that the third rolling section 23 of the second embodiment is connected to the second rolling section 22 thereof in a leftwardly-slanting manner relative to line Y. The gear-type rolls 46 and 47 have the same gear-shaped cross sections as the rolls of the second embodiment, being formed with the same concavities and convexities on the surfaces thereof. In the third embodiment, the noodle sheet M is kneaded and rolled by the concavities and convexities of each gear roll 46 or 47 which is arranged across the boundary center of the width WA of the noodle sheet M. Therefore, substantially the same noodle sheet M as obtained in the second embodiment can be obtained in the third embodiment.

Figure 6:
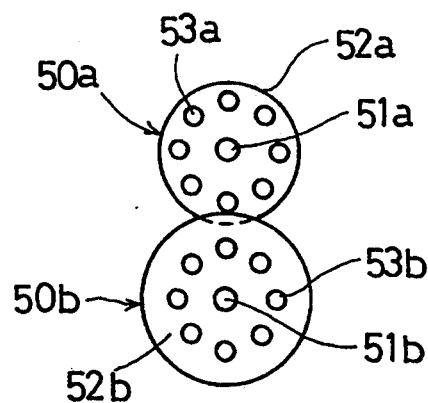
FIG. 6 is a side view of a pair of cage type rolls.
Figure 12A:
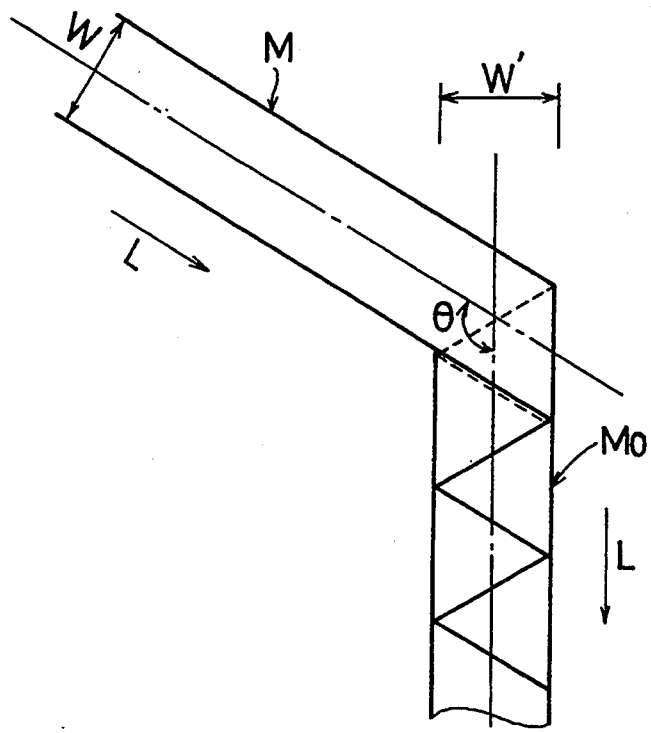
FIGS. 12(a) and 12(b) are explanatory representations of a way for folding the noodle sheet when rolled after folding.
Figure 12B:
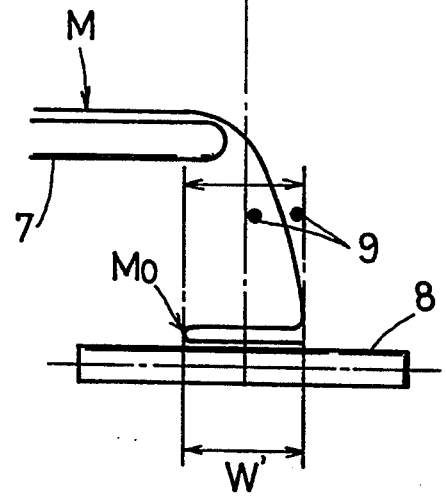

It should be noted that the rolls of the second rolling section 42 of the above embodiment are not limited to the gear-type rolls with concavities and convexities. FIG. 6 shows upper and lower cage-type rolls 50a and 50b, in which a pair of upper circular plates 52a (only one is shown) and a pair of lower circular plates 52b (only one is shown) are mounted on both ends of roll shafts 51a and 51b, respectively, and rolling pins 53a and 53b are extended between the upper plates 52a and between the lower plates 52b, respectively, with their ends equally displaced on the circumference thereof. Further, the pair of upper and lower rolls of the first rolling section 43 may be replaced by a combination of a grooved roll and a smooth roll. Further, the pair of upper and lower rolls of the second and third rolling sections 42 and 43 may be replaced by a combination of a grooved roll or a cage-type roll and a smooth roll. In these cases, the smooth rolls serves as a kneading board.

With the above described construction, the noodle sheet of the present invention can be pressed not only in the conventional longitudinal direction but also in the transverse direction. Each concavity and convexity of the pair of grooved rolls and the pair of gear-type rolls provide the same kneading and pressing operations that can be obtained when kneading noodles with hands or soles. The structure of gluten is uniformly produced in a network over the entire noodle sheet, and the bonding of gluten enhances water-holding capacity. Thus, the noodle sheet can be regulated to a proper density and can be kneaded as satisfactorily as hand-kneaded noodles. Fine noodles of the same taste and texture as handmade noodles can be obtained when the noodle sheet is cut into strips.

While the invention has been described with reference to preferred embodiments thereof, it is to be understood that modifications or variations may be easily made without departing from the scope of the present invention which is defined by the appended claims.

What is claimed is:

1. A rolling mill for use in a noodle making apparatus, of the type adapted for rolling a noodle sheet of a predetermined width, the rolling mill comprising a plurality of rolling sections arranged in a set and each including pairs of upper and lower rolls, the set including a pair of grooved rolls for pressingly forming a plurality of mountain and valley portions on the noodle sheet parallel to the extending longitudinal direction thereof, and at least one pair of gear-type rolls for pressingly forming a plurality of mountain and valley portions on the noodle sheet parallel to the transverse direction thereof.

2. The rolling mill as defined in claim 1, wherein the gear-type rolls are two pairs and are obliquely disposed in such a manner as to be spread apart from each other at a predetermined angle relative to and across a line parallel to the transverse direction of the noodle sheet.

3. The rolling mill as defined in claim 1, wherein the gear-type rolls are four pairs and are disposed in such a manner as to be spread apart toward both sides of the noodle sheet at a predetermined angle around the intersection of a center line extending in the longitudinal direction of the noodle sheet and a transverse line perpendicular to the center line.

4. The rolling mill as defined in claim 1, wherein the pair of the gear-type rolls are a pair of cage-type rolls.

* * * * *